United States Patent
Zhou et al.

(10) Patent No.: US 9,110,541 B1
(45) Date of Patent: Aug. 18, 2015

(54) INTERFACE SELECTION APPROACHES FOR MULTI-DIMENSIONAL INPUT

(71) Applicant: Amazon Technologies, Inc., Reno, NV (US)

(72) Inventors: Dong Zhou, San Jose, CA (US); Jason Robert Weber, Mountain View, CA (US); Matthew Paul Bell, Sunol, CA (US); Stephen Michael Polansky, Santa Clara, CA (US); Guenael Thomas Strutt, San Jose, CA (US); Isaac Scott Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 16 days.

(21) Appl. No.: 13/830,845

(22) Filed: Mar. 14, 2013

(51) Int. Cl.
- G09G 5/00 (2006.01)
- G06F 3/041 (2006.01)
- G06F 3/042 (2006.01)
- G06F 3/033 (2013.01)

(52) U.S. Cl.
CPC ..................... G06F 3/042 (2013.01)

(58) Field of Classification Search
USPC ....................................................... 345/175
See application file for complete search history.

(56) References Cited

U.S. PATENT DOCUMENTS

| | | | |
|---|---|---|---|
| 5,594,469 A * | 1/1997 | Freeman et al. | 345/158 |
| 7,847,789 B2 * | 12/2010 | Kolmykov-Zotov et al. | 345/173 |
| 8,354,997 B2 * | 1/2013 | Boillot | 345/158 |
| 8,769,409 B2 * | 7/2014 | Weng et al. | 715/716 |
| 8,803,801 B2 * | 8/2014 | El Dokor et al. | 345/156 |
| 8,933,876 B2 * | 1/2015 | Galor et al. | 345/156 |
| 2004/0178995 A1 * | 9/2004 | Sterling | 345/173 |
| 2008/0005703 A1 * | 1/2008 | Radivojevic et al. | 715/863 |
| 2009/0058830 A1 * | 3/2009 | Herz et al. | 345/173 |
| 2009/0079813 A1 * | 3/2009 | Hildreth | 348/14.03 |
| 2009/0183125 A1 * | 7/2009 | Magal et al. | 715/863 |
| 2009/0217211 A1 * | 8/2009 | Hildreth et al. | 715/863 |
| 2010/0095206 A1 * | 4/2010 | Kim | 715/702 |
| 2010/0295781 A1 * | 11/2010 | Alameh et al. | 345/158 |
| 2011/0018795 A1 * | 1/2011 | Jang | 345/156 |
| 2011/0267265 A1 * | 11/2011 | Stinson | 345/157 |
| 2011/0289456 A1 * | 11/2011 | Reville et al. | 715/830 |
| 2011/0302519 A1 * | 12/2011 | Fleizach et al. | 715/773 |
| 2011/0310005 A1 * | 12/2011 | Chen et al. | 345/156 |
| 2013/0016102 A1 * | 1/2013 | Look et al. | 345/426 |
| 2013/0342459 A1 * | 12/2013 | Karakotsios et al. | 345/159 |

* cited by examiner

Primary Examiner — Temesgh Ghebretinsae
Assistant Examiner — Benyam Ketema
(74) Attorney, Agent, or Firm — Novak Druce Connolly Bove + Quigg LLP

(57) ABSTRACT

Touch-based input to a computing device can be improved by providing a mechanism to lock or reduce the effects of motion in unintended directions. In one example, a user can navigate in two dimensions, then provide a gesture-based locking action through motion in a third dimension. If a computing device analyzing the gesture is able to detect the locking action, the device can limit motion outside the corresponding third dimension, or lock an interface object for selection, in order to ensure that the proper touch-based input selection is received. Various thresholds, values, or motions can be used to limit motion in one or more axes for any appropriate purpose as discussed herein.

25 Claims, 8 Drawing Sheets

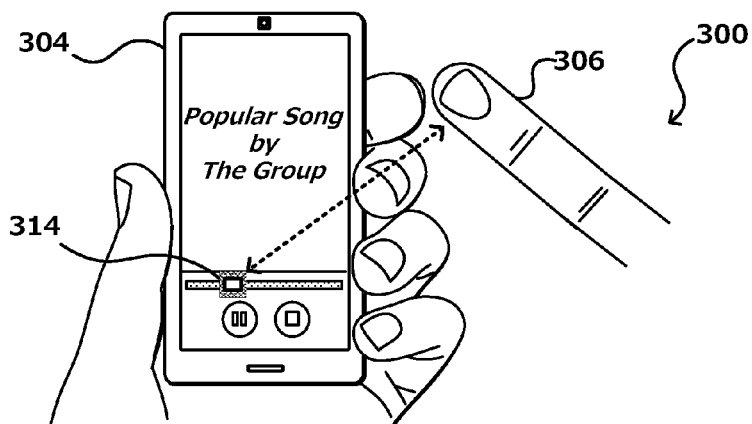
FIG. 3A
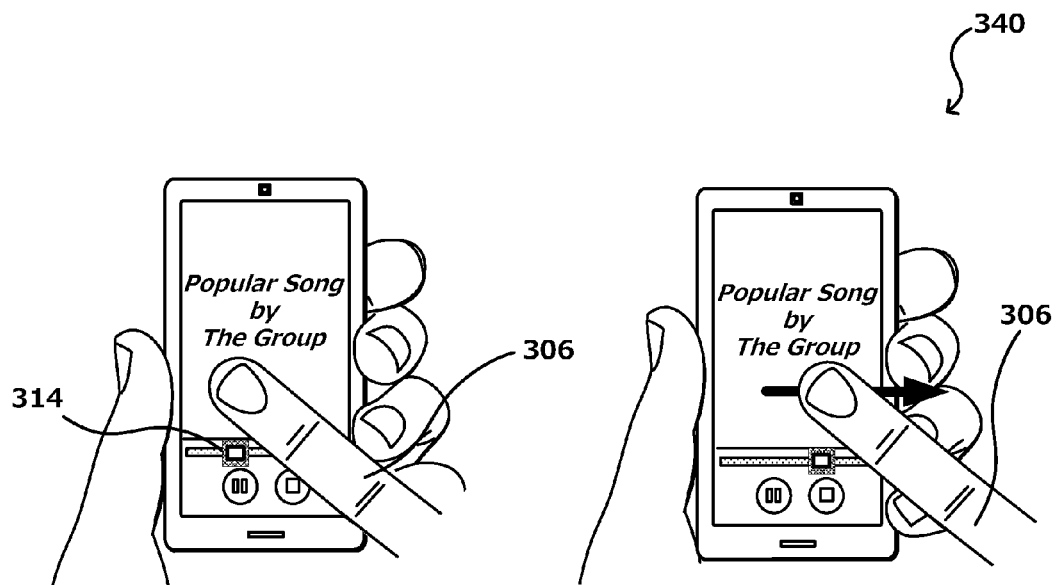
FIG. 3B          FIG. 3C

INTERFACE SELECTION APPROACHES FOR MULTI-DIMENSIONAL INPUT

BACKGROUND

As the variety of available computing devices increases, and as the size of many of these devices decreases, there comes a need to adapt the ways in which users interact with these devices. One such interaction approach includes making gestures or specific motions within a detectable range of a device. For example, a user can move a hand in a certain direction to provide input to the device, where the three-dimensional position of the user's hand can be used to highlight or select a clickable object or element that is currently under the a fingertip of the user's hand. However, as the user attempts to select the clickable object or element such as by tapping the object, a different clickable object may be selected because of unsteadiness of the user's finger and/or noise in the device's system for three-dimensional (3D) position detection. Further, in applications and/or services with small clickable objects, the size of the user's finger can also inhibit the user from successfully selecting an intended object or element on the screen.

BRIEF DESCRIPTION OF THE DRAWINGS

Various embodiments in accordance with the present disclosure will be described with reference to the drawings, in which:

FIGS. 3A-3C illustrate an example interaction with a locked interface object, in accordance with an alternate embodiment;

DETAILED DESCRIPTION

Figure 1A:
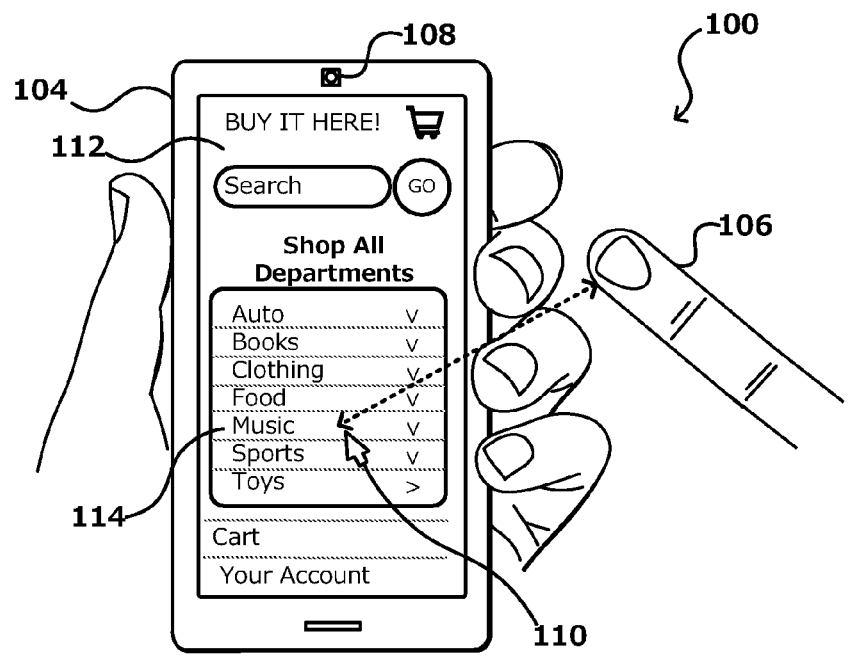
FIGS. 1A and 1B illustrate an example approach for providing input to a computing device to lock an interface object for selection, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches to providing input to an electronic device. In particular, various embodiments enable a user to provide various types of input to an electronic device using motions or gestures performed at a distance from the device. In at least some embodiments, a user is able to perform gestures or other such motions within a field of view of one or more cameras of a computing device. The camera(s) can capture image information that can be analyzed to locate and track at least one user feature or object used to perform the gesture or action. The computing device can utilize a recognized gesture or action to determine input to be provided, such input being able to cause the device to lock for selection an object or element being displayed on a display screen of the device.

Accordingly, approaches in accordance with various embodiments can improve the accuracy of touch-based input by accounting for drift or unintended changes due to natural human motion and other such factors. Various embodiments can attempt to determine different types of actions or gestures, such as selection and/or locking actions that are performed using motion along one axis or direction with respect to the device. In this way, in response to detecting a user's finger or other object reaching a threshold distance from the surface of the display screen, or a finger or other object detected above a threshold distance from the display screen for a threshold period of time, the device can cause a selection element, a selectable interface object, or some other selectable target to be locked for selection until at least an unlock event is detected. In this way, when the user's finger or some other feature such as a second finger contacts at least a portion of the surface of the display screen, the locked selectable target is selected. Accordingly, even though the user might utilize motion in other directions while performing the touch-based input, the device can lock or limit the amount of motion in one or more other directions, to attempt to improve the accuracy of the intended touch-based input. Such approaches can be used for any dimension, axis, plane, direction, or combination thereof, for any appropriate purpose as discussed and suggested elsewhere herein. Such approaches also can be utilized where the device is moved relative to a user feature or other such object.

In various other embodiment, when an unlocking event is detected, such as when the 3D position of the user's finger is no longer detected above the selectable target for at least a threshold period of time, when the user makes contact with at least a portion of the surface of the display screen, or when the user's finger used for locking for selection the selectable target is not detected by a 3D position detection system for at least a threshold period of time, the selectable target or selection element becomes unfixed to once again enable control thereof by the user.

Various other functions and advantages are described and suggested below as may be provided in accordance with the various embodiments.

As mentioned above, certain portable computing devices (such as mobile phones) can support hover-based user interactions (e.g., motion- or gesture-based input), where the device can locate and track a three-dimensional (3D) position of a user's fingertip and use the position information of the user's fingertip to perform different types of actions (e.g., such as a selection action to select an interface object on a display of the device). However, when using a conventional device that supports motion- or gesture-based input, when a user's finger pr some other feature such as a second finger attempts to touch at least a portion of the surface of a display screen to select a desired interface object, a different interface object may inadvertently be selected because of unsteadiness of the finger or device, noise in the system for 3D position detection, and/or due to the difficulty in selecting small selectable elements or objects. Accordingly, systems and methods in accordance with various embodiments can provide for improved touch-based input by enabling a device to "lock" or otherwise fix a selection element or a desired selectable interface object until an unlock triggering event is detected. In this way, locking the selection element or selectable interface object can improve the accuracy of touch-based input by accounting for drift or unintended changes due to natural human motion, noise in the system for 3D position detection, and other such factors. Additionally, various thresholds, sensitivities, or limits can be set or adjusted as appropriate to improve the accuracy of the various locking techniques.

As described above, by being able to track the motion of a feature or object with respect to the device, the device can enable a user to interact with an interface displayed on the device, for example, and lock for selection one or more objects displayed or otherwise presented as part of that interface. For example, in the situation 100 of FIG. 1A, a user is able to provide input to a computing device 104 by moving a feature, such as the user's fingertip 106, within a field of view of at least one camera 108 or sensor of the computing device. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. In this example, the computing device includes at least one camera operable to capture images and/or video of the user's fingertip and analyze the relative position and/or motion of that feature over time to attempt to determine input that the user intends to provide to the device. It should be understood, however, that there can be additional cameras or alternative sensors or elements in similar or different places with respect to the device in accordance with various embodiments. The image can be analyzed using any appropriate algorithms to recognize and/or locate a feature of interest, as well as to track that feature over time.

By being able to track the motion of a feature or object with respect to the device, the device can enable a user to interact with the interface displayed on the device, for example, and lock a selection element and/or an interface object displayed or otherwise presented as part of that interface. For example, in the situation 100 of FIG. 1A a user is able to move the user's fingertip 106 in a virtual plane with respect to the device 104, such as in horizontal and vertical directions with respect to the display screen of the device, in order to move a virtual cursor 110 or other selection element across a web page 112 displayed on the display screen of the computing device. The cursor can move with the user's hand, finger, or other such feature as that feature moves with respect to the device, in order to enable the user to control the virtual cursor without physically contacting the device. While a cursor is used in this example, it should be understood that any appropriate interface element can utilize approaches discussed herein within the scope of the various embodiments. It should be further understood that in various embodiments, as the user's hand, finger, or other such feature moves with respect to the device, no cursor or interface element is displayed.

Before selecting an interface object or other selectable object, such as music category 114, the user can perform a locking action with the tracked feature. In accordance with an embodiment, the locking action can include moving the feature towards the device, whether by moving the user's entire hand or making a "push" motion with the user's fingertip to virtually "push" or "press on" the interface object. The device is able to distinguish this motion (herein referred to as a z-motion) along an axis orthogonal to the display screen of the device from the motion in a plane parallel to the display screen to move the cursor (herein referred to as x/y motion). The z-motion then can be used to indicate to the device that the currently indicated interface object is to be locked for selection. It should be understood that in at least some embodiments the x/y motion does not need to be in a plane parallel to the display screen, and that at least some tilt or angle can be allowed within the scope of the various embodiments.

Other actions can be used to perform the locking action as well, such as when a user causes the virtual cursor to be moved to a desired interface object or other selectable interface object of the web page for a determined period of time. In this instance, when the virtual cursor is illustrated to be positioned over the desired interface object, for example, for the determined period of time (e.g., three seconds), the virtual cursor and/or the interface object is locked for selection and remains fixed until an unlock event occurs. Further still, a locking action can be performed when the tracked feature is detected at a threshold distance from the surface of the computing device. In this situation, the interface object to which the virtual cursor is hovered over (or the virtual cursor) is locked when the tracked feature is detected at least the threshold distance from the surface of the computing device.

In accordance with an embodiment, various thresholds, sensitivities, or limits can be set or adjusted as appropriate to improve the accuracy of gesture interpretation and/or input determination such as for the locking action. For example, as described, a user can use a feature such as the user's finger to select links (e.g., categories) from a web site displayed on a computing device. In order to move a virtual cursor or other indicator "across" the screen, the user can move the user's finger in a plane substantially parallel to the plane of the display screen, for example. The distance of this plane or vector can be determined based at least in part upon the original distance to the user's finger as detected or estimated by the device. In one instance, when a user wants to lock for selection a link or category, the user will move that finger (or another finger) towards the device in order to virtually "tap" on that link. In order to be recognized as a locking action or gesture, the user must move the finger forward by a minimum amount in this example. Accordingly, that amount of movement can be set as a threshold distance from the device within which the user must move the finger to perform a locking action. If the user does not move the finger within that threshold distance, any variation in z can be interpreted as natural variations in distance resulting from a user moving the finger in the x/y plane (or another such action).

When a user moves the fingertip (or another tracked feature) within that locking threshold distance, the movement can be registered as a locking action, which can cause the device to disregard movement in at least one dimension. Further still, this can cause the device to lock at least one interface device. In accordance with an embodiment, the locking action can improve the accuracy of the touch-based since such an approach prevents the user's finger from inadvertently moving in x/y direction during a touch input, which may cause the user to select an incorrect link and or category. The position in x/y can be locked as of when the feature passed the threshold, or at the beginning of the z-motion, as may rely upon buffered location data or other such information. For example, in at least one embodiment, the device can keep track of where the finger was when the locking action started, and can utilize those x/y coordinates for the position of the locking action.

It should be understood that various other types of thresholds or limits can be used as well within the scope of the various embodiments, and that the thresholds can be applied to movement in any direction or along any appropriate axis. Further, the position and/or value of these thresholds can vary as well, such as by user, by device, by application, etc. In some embodiments, the thresholds can be a fixed distance or proportional distance, while in other embodiments the thresholds can vary based upon factors such as user distance, accuracy under current conditions, and the like. Further, in some embodiments a user can set or adjust the thresholds manually, while in other embodiments the thresholds are determined automatically or generated as part of a calibration procedure. Various other approaches can be used as well within the scope of the various embodiments.

For example, in accordance with an embodiment, in addition to, or instead of causing a locking action to occur when the feature reaches a locking threshold distance from the display screen of the device, other actions can be used to perform the locking action as well, such as when a user causes the virtual cursor to be moved to a desired interface object or other selectable interface object of the web page for a determined period of time. In this instance, when the virtual cursor is illustrated to be positioned over the desired interface object, for example, for the determined period of time (e.g., three seconds), the virtual cursor is locked and remains fixed until an unlock event occurs. In some instances, rather than lock the virtual cursor (or in addition to locking the virtual cursor) the interface object to which the virtual cursor is selecting is locked when the feature (e.g., finger) is detected above the interface object for a locking threshold period of time.

The locking or limiting of motion input can be performed as part of the detection hardware, part of the analysis software, or at any other appropriate location. Aspects can also be implemented at various different levels as well, such as at the application, API, or operating system level. For example, a gesture sensor having detected a locking action might ignore movement in x/y or only report movement in z. An algorithm determining a locking action might only analyze the z-data until the locking action is over or another such action occurs. In some embodiments, an application might accept and buffer data in all three dimensions, but lock or limit the input along one or more axes upon certain motions or actions. If data is buffered, an additional advantage is that the data can be analyzed if the device later determines that the motion was not part of a locking action, or input should otherwise not have been locked or limited. Various other approaches can be used as well within the scope of the various embodiments.

Figure 1B:
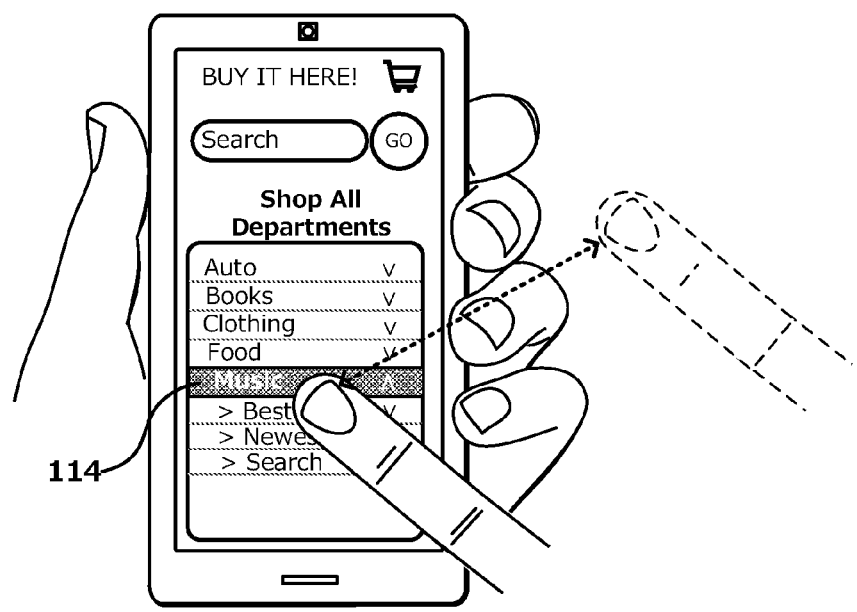

As described, the locking action can be used to lock the selection element (e.g., the virtual cursor) and/or an interface object until at least an unlock event is detected. For example, as shown in FIG. 1B, an interface object (e.g., the music category 114) and/or the selection element can locked such that the current position of a virtual cursor or other selection element does not change position even though movement of a feature controlling the virtual cursor does. In accordance with various embodiments, locking the music category prior (or the selection of the music category) to receiving a touch-based input or other selection action at the surface of the display screen of the computing device can improve the accuracy of touch-based input by accounting for drift or unintended changes due to natural human motion, noise in the 3D detection system, and other such factors. For example, if the user were to unintentionally (or intentionally) touch another area of the display screen, the locked interface object (e.g., the music category) would be selected instead of, e.g., an unintentionally selected interface object.

In accordance with an embodiment, when the music category (or selection element) is locked, the music category can be highlighted to visually convey that the category is locked. For example, as shown in FIG. 1B, in response to locking music category 114, the music category is highlighted or otherwise emphasized. In some embodiments, a different color highlight can be used for the situation of selecting (but not locking) the selectable interface object, such as when a virtual cursor is hovered over the interface object for a threshold period of time less than the locking threshold period of time. For example, for each interface object to which the selection element hovers over, that interface object can be highlighted in a particular color (e.g., orange). If the interface object is locked for selection, the color used to highlight the interface object can change, e.g., to green. In this way, different colors of highlighting can be used depending on whether the interface object is locked or selected to be locked.

It should be noted that there are various other ways to convey that an interface object is locked (or unlocked) for selection (or is selected to be locked). By example, the appearance of the interface object can be altered by changing the size, font, color, or location of the interface object. Additionally, or alternatively, the interface object can be animated when it is locked. In yet another embodiment, audio or tactile feedback, such as an alert, can be used to convey selecting and/or locking an interface object for selection. In some embodiments, no feedback is provided when an interface object is locked for selection (or is selected to be locked).

Upon locking the music category (and in some instance even when the music category is not locked), the user's fingertip or some other feature can be used to select or otherwise interact with the music category by touching the screen of the device. As will be described further in FIGS. 2A-2C and FIGS. 3A-3C, the locked interface object can be selected or otherwise interacted with in a number of different ways. As described above, one way in which the locked interface object can be selected is by touching the object on the display screen with the tracked feature (e.g., finger) that was used to lock the element. In accordance with various other embodiments, a locked interface object can be selected or otherwise interacted with by touching the object on the display with feature other than the one used to initially lock the interface object.

Figure 2A:
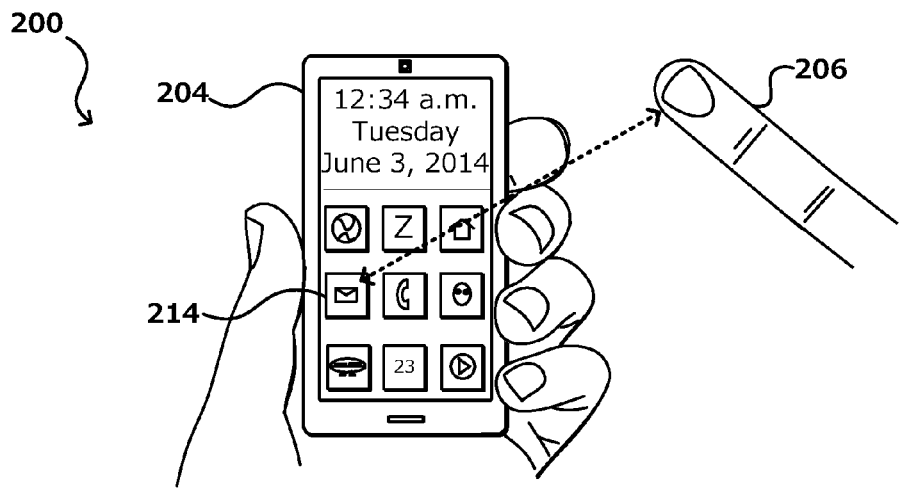
FIGS. 2A-2C illustrate an example interaction with a locked interface object, in accordance with various embodiments.

For example, as shown in situation 200 in FIG. 2A a user is able to provide input to a computing device 204 by moving a feature, such as the user's fingertip 206, within a field of view of at least one camera or sensor of the computing device. By being able to track the motion of the feature with respect to the device, the device can enable the user to interact with an interface displayed on the device, for example, and lock for selection one or more interface objects displayed or otherwise presented as part of that interface. For example, in situation 200 of FIG. 2A, the user is able to move the user's finger in a virtual plane with respect to a device, such as in horizontal and vertical directions with respect to the display screen of the device, in order to lock for selection one of the application icons. In certain embodiments, a visual cursor can optionally be enabled, wherein as the user moves their finger with respect to the device, a virtual cursor or other selection element can be caused to be moved across the display screen of the computing device. The cursor can move with the user's hand, finger, or other such feature as that feature moves with respect to the device, in order to enable the user to control the virtual cursor without physically contacting the device.

When the user wants to lock for selection one of the application icons (e.g., mail application icon 214), the user can perform one or more of a number of locking actions. For example, as shown in situation 240 in FIG. 2B, the user's finger has been placed above mail application icon 214 and finger 206 has been moved towards the device at least a locking threshold distance from the computing device. Detecting the finger at the threshold distance from the device causes the device to lock the application icon and/or a current position of a virtual cursor (is shown). In accordance various other embodiments, other locking actions can include detecting the user's finger hovered over the desired application icon or other selectable interface object for a predetermined period of time. In this instance, when the user's finger is positioned over the desired application icon, for example, for the predetermined period of time (e.g., three seconds), the application icon can be locked for selection and remains locked until an unlock event occurs.

Figure 2B:
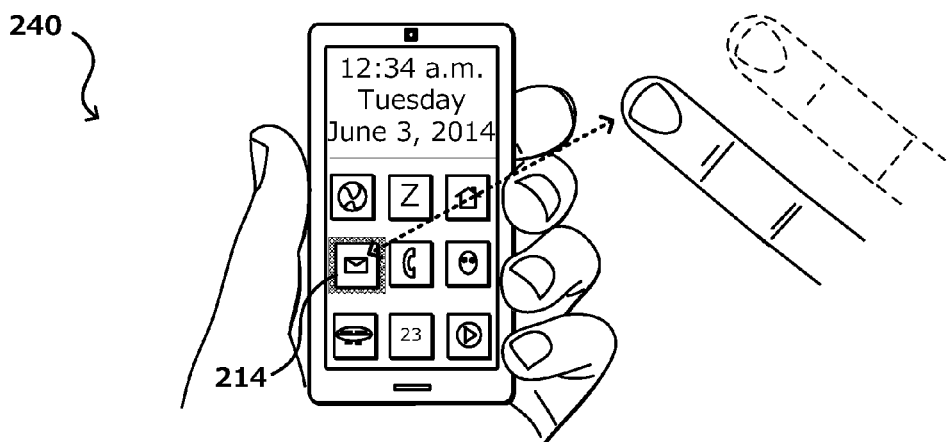
Figure 2C:
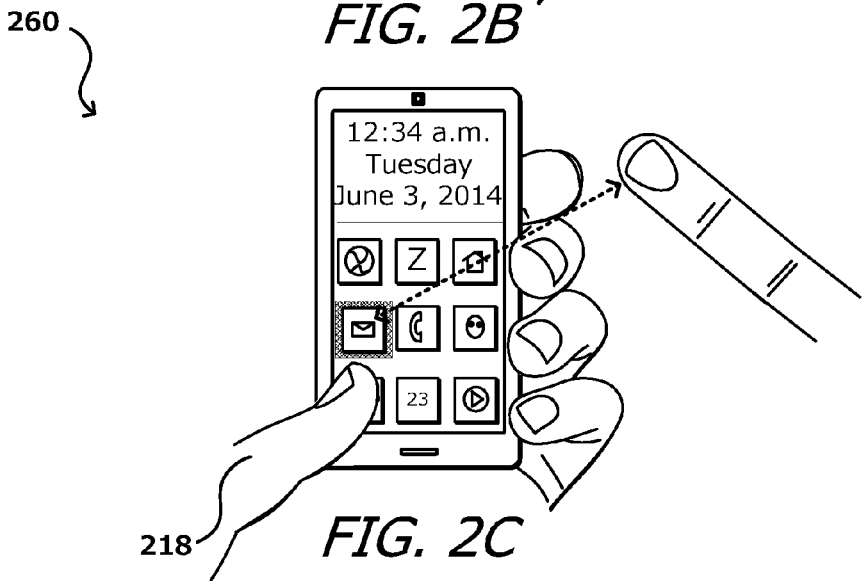

When mail application icon 214 is locked, the application can be highlighted to visually convey that the application icon is locked. For example, as shown in FIG. 2B, mail application icon 214 is highlighted or otherwise emphasized in comparison to the other application icons.

The user can select the mail application icon by touching any portion of the display screen of the computing device. As described in FIGS. 1A-1B, the link was selected by touching the link with the finger used to perform the locking action. In accordance with various embodiments, a locked interface object can be selected or otherwise interacted with by touching the interface object, or any portion of the display screen, with a feature different from the feature used to lock the interface object. For example, as shown in situation 260 in FIG. 2C, thumb 218 of the user is used to select the mail application icon by touching the display screen of the device. It should be noted that upon locking the mail application icon, or any interface object, touching any portion of the display screen selects the locked interface object. For example, in this instance, although the user taps the area of the display screen below the mail application icon, because the mail application icon is locked for selection, touching any portion of the display screen selects the locked mail application icon.

FIGS. 3A-3C illustrate a situation where a locked interface object is selected or otherwise interacted with by touching any portion of the display of a computing device. As shown in situation 300 in FIG. 3A, a user is able to provide input to a computing device 304 by moving a feature, such as the user's fingertip 306, within a field of view of at least one camera or sensor of the computing device. In this example, the user locks for selection a slider/scrubber control 314. In accordance with an embodiment, the slider control can be used to rewind or fast-forward through a song or other media file. When the slider control 314 is locked for selection, the slider control can be highlighted to visually convey that the slider is locked.

The user can interact with the slider control, such as by moving the slider control left or right by touching any portion of the display of the device with the locking finger or some other feature, and moving that feature substantially to the right of left while making contact with the display. For example, as shown in situation 340 in FIGS. 3B and 3C, fingertip 306 of the user contacts at least a portion of the surface of the display screen of the computing device. In this situation, above the slider control, where the finger is moved substantially to the right while making contact with the display screen. The device detects this touch-based input and causes the media track to fast-forward. Similarly, detecting the finger sliding across the screen substantially in a direction opposite the direction shown (i.e., to the left) can cause the device to rewind the media track. Accordingly, in various embodiments, a locked interface object can be interacted with by touching any portion of the display of the device until an unlock event is detected, as is described further in FIGS. 4A-4C.

Figure 4A:
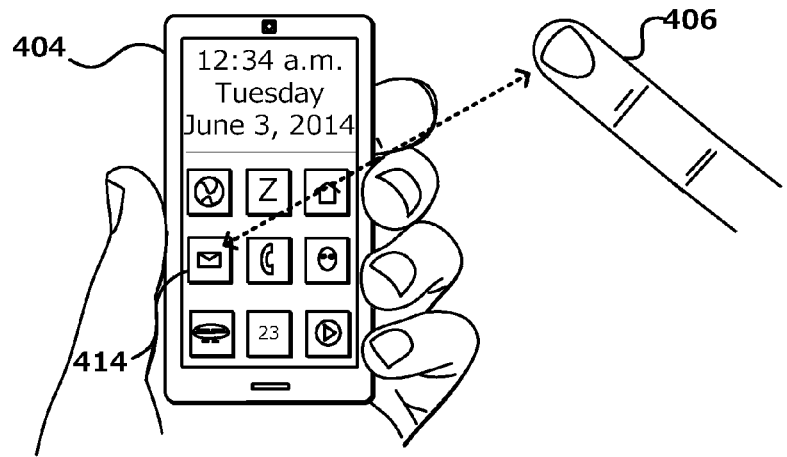
FIGS. 4A-4C illustrate unlock events that can cause a computing device to unlock a lock interface object, in accordance with an embodiment.
Figure 4B:
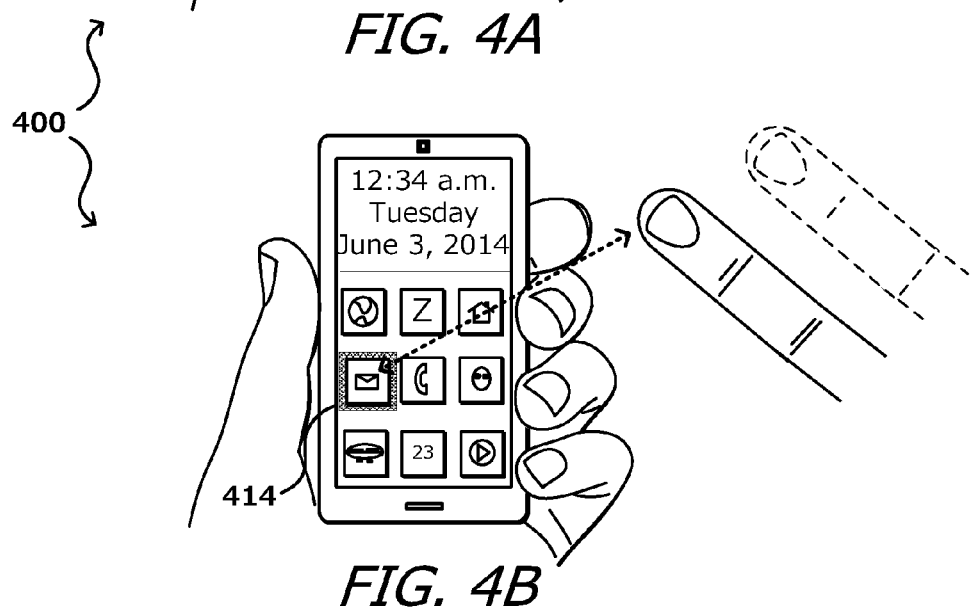
Figure 4C:
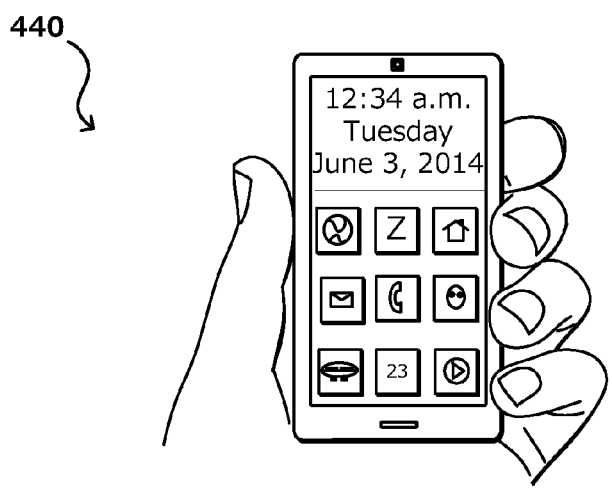

FIGS. 4A-4C illustrate an event that can cause the computing device to unlock a locked interface object and/or a virtual cursor, in accordance with various embodiments. As shown in situation 400 in FIGS. 4A and 4B, a user has locked for selection a mail application icon 414 by moving a feature, such as the user's fingertip 406, to at least a threshold distance from the computing device. When the mail application is locked, the user can select or otherwise interact with the application by touching at least a portion of the display of the device. When interacting with the application, the user can use the finger that caused the mail application to be selected and locked, or a different feature such as a second finger. Additionally, in some embodiments, the user can lift their finger from the display of the device, and at some other point interact with the display of the device to interact with the application. However, in various instances, a user may want to unlock the locked application and/or the current position of the virtual cursor to select a different application, link, or other interface object. In this instance, the user can perform an unlock event that can cause the device to unlock the current locked interface object and/or the current position of the virtual cursor. Thereafter, the virtual cursor can move across the display screen of the device in two dimensions corresponding to movement of the fingertip.

In accordance with an embodiment, an unlock event can include moving fingertip 406 away from a locked object for more than a unlock time threshold. Additionally, an unlock event can include tapping any portion of the display of the computing device, and/or determining when the fingertip or other feature used for locking for selection a selectable object is not detected by the 3D position detection system for at least a threshold period of time. In any situation, the locked object is unlocked when the unlock event is detected, and the object is no longer highlighted (e.g., when previously highlighted), as shown in situation 440 in FIG. 4C.

As discussed, various approaches enable a user to provide input to a device through motion or gesture input. For example, a user is able to provide input to a computing device by moving a feature, such as the user's fingertip, within a field of view of at least one camera or sensor of the computing device. While the device in this example is a portable computing device, such as a smart phone, tablet computer, or personal data assistant, it should be understood that any appropriate computing or electronic device can take advantage of aspects of the various embodiments, as may include personal computers, set top boxes, smart televisions, video game systems, and the like. In this example, the computing device includes a single camera operable to capture images and/or video of the user's fingertip and analyze the relative position and/or motion of that feature over time to attempt to determine input that the user intends to provide to the device. It should be understood, however, that there can be additional cameras or alternative sensors or elements in similar or different places with respect to the device in accordance with various embodiments. The image can be analyzed using any appropriate algorithms to recognize and/or locate a feature of interest, as well as to track that feature over time.

Additionally, approaches in accordance with various embodiments can capture and analyze image information or other sensor data to determine information such as the relative distance and/or location of a feature of the user that is capable of providing (or assisting in providing) such input. In various embodiments, to determine the location of the user's finger (or other object), with respect to a display screen or other such element of a computing device, a number of potential approaches can be used. For example, FIGS. 5A-5D illustrate an example approach to determining a relative distance and/or location of the user's finger, hand or other feature that can be utilized in accordance with various embodiments. In this example, input can be provided to a computing device 502 by monitoring the location of the user's fingertip 504 with respect to the device, although various other features of the user can be used as well, as discussed and suggested elsewhere herein. In some embodiments, a single camera (e.g., front facing camera) can be used to capture image information including the user's fingertip, where the relative location can be determined in two dimensions from the position of the fingertip in the image and the distance 590 determined by the relative size of the fingertip in the image. In other embodiments, a distance detector or other such sensor can be used to provide the distance information. The illustrated computing device 502 in this example instead includes at least two different image capture elements 506, 508 positioned on the device with a sufficient separation such that the device can utilize stereoscopic imaging (or another such approach) to determine a relative location of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 506 is able to see the fingertip 504 of the user as long as that feature is within a field of view 510 of the upper camera 506 and there are no obstructions between the upper camera and that feature. If software executing on the computing device (or otherwise in communication with the computing device) is able to determine information such as the angular field of view of the camera, the zoom level at which the information is currently being captured, and any other such relevant information, the software can determine an approximate direction 514 of the fingertip with respect to the upper camera. In some embodiments, methods such as ultrasonic detection, feature size analysis, luminance analysis through active illumination, or other such distance measurement approaches can be used to assist with location determination as well.

Figure 5A:
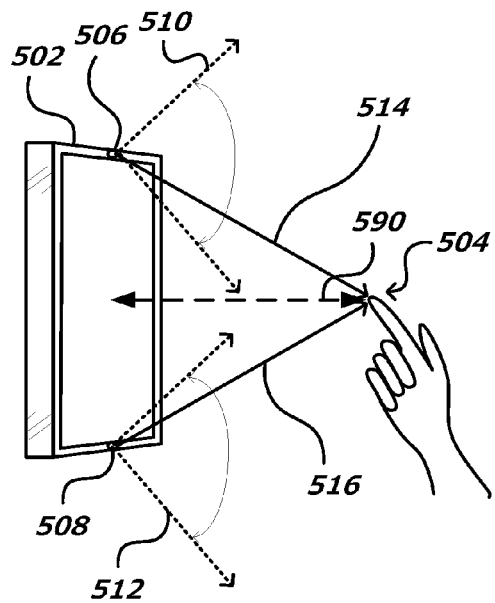
FIGS. 5A-5D illustrate an example approach to determining a relative distance and/or location of at least one feature of a user that can be utilized in accordance with various embodiment.

In this example, a second camera is used to assist with location determination as well as to enable distance 590 determinations through stereoscopic imaging. The lower camera 508 in FIG. 5A is also able to image the fingertip 504 as long as the feature is at least partially within the field of view 512 of the lower camera 508. Using a similar process to that described above, appropriate software can analyze the image information captured by the lower camera to determine an approximate direction 516 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance 590 to an object, such as a feature of a user (e.g., fingertip). For example, a device can determine the size of a feature (e.g., a finger, hand, pen, or stylus) used to provide input to the device. By monitoring the relative size in the captured image information, the device can estimate the relative distance 590 to the feature. This estimated distance 590 can be used to assist with location determination using a single camera or sensor approach.

Figures 5B, 5C:
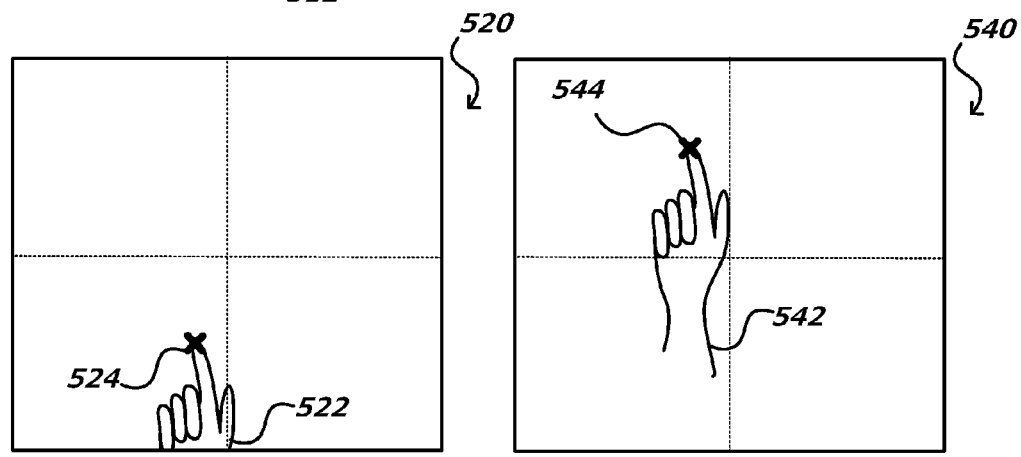

Further illustrating such an example approach, FIGS. 5B and 5C illustrate example images 520, 540 that could be captured of the fingertip using the cameras 506, 508 of FIG. 5A. In this example, FIG. 5B illustrates an example image 520 that could be captured using the upper camera 506 in FIG. 5A. One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 522, at least one point of interest 524, here the tip of the user's index finger, is determined. As discussed above, the software can use the location of this point with information about the camera to determine a relative direction to the fingertip. A similar approach can be used with the image 540 captured by the lower camera 508 as illustrated in FIG. 5C, where the hand 542 is located and a direction to the corresponding point 544 determined. As illustrated in FIGS. 5B and 5C, there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 5A, however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 5D:
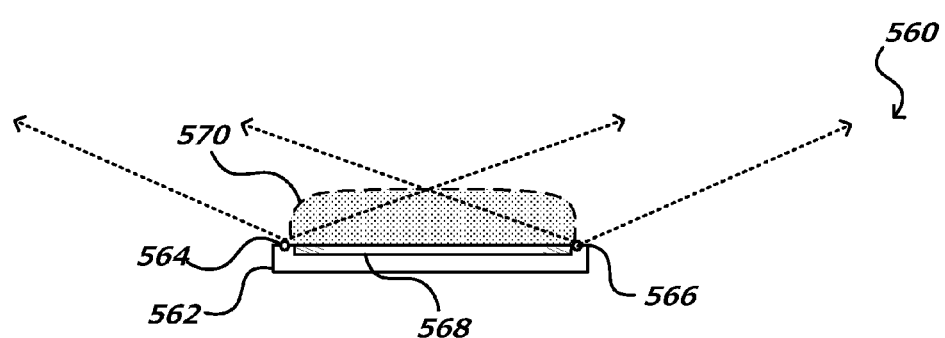

FIG. 5D illustrates an example configuration 560 wherein the device 562 includes a pair of front-facing cameras 564, 566 each capable of capturing images over a respective field of view. If a fingertip or other feature near a display screen 568 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen. By adjusting the parameters of the capacitive touch detection component, the device can have a detection range 570 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

As mentioned, various approaches can be used to attempt to locate and track specific features over time. One such approach utilizes ambient-light imaging with a digital camera (still or video) to capture images for analysis. In at least some instances, however, ambient light images can include information for a number of different objects and thus can be very processor and time intensive to analyze. For example, an image analysis algorithm might have to differentiate the hand from various other objects in an image, and would have to identify the hand as a hand, regardless of the hand's orientation. Such an approach can require shape or contour matching, for example, which can still be relatively processor intensive. A less processor intensive approach can involve separating the hand from the background before analysis.

In at least some embodiments, a light emitting diode (LED) or other source of illumination can be triggered to produce illumination over a short period of time in which an image capture element is going to be capturing image information. The LED can illuminate a feature relatively close to the device much more than other elements further away, such that a background portion of the image can be substantially dark (or otherwise, depending on the implementation). In one example, an LED or other source of illumination is activated (e.g., flashed or strobed) during a time of image capture of at least one camera or sensor. If the user's hand is relatively close to the device the hand will appear relatively bright in the image. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking. In embodiments where the detection time is short, there will be relatively little power drained by flashing the LED in at least some embodiments, even though the LED itself might be relatively power hungry per unit time.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

In some embodiments, a computing device might utilize one or more motion-determining elements, such as an electronic gyroscope, to attempt to assist with location determinations. For example, a rotation of a device can cause a rapid shift in objects represented in an image, which might be faster than a position tracking algorithm can process. By determining movements of the device during image capture, effects of the device movement can be removed to provide more accurate three-dimensional position information for the tracked user features.

Figure 6:
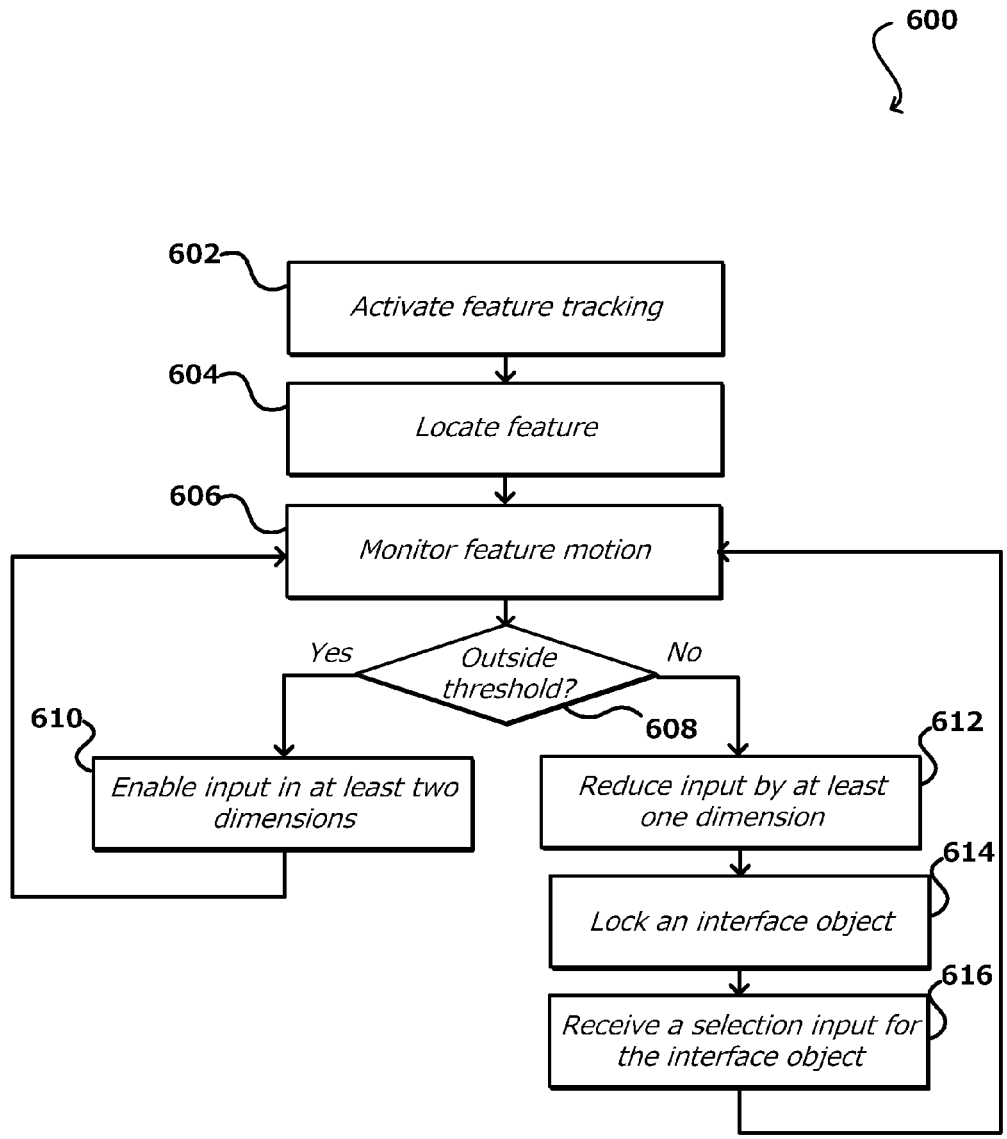
FIG. 6 illustrates an example process for providing input to a computing device to lock an interface object for selection in accordance with various embodiments.

FIG. 6 illustrates an example process 600 for providing input to a computing device using gesture and/or motion input to lock for selection an interface object, in accordance with various embodiments. It should be understood that, for any process discussed herein, there can be additional, fewer, or alternative steps performed in similar or alternative orders, or in parallel, within the scope of the various embodiments unless otherwise stated. In this example, feature tracking is activated 602 on a computing device. The tracking can be activated manually, by a user, or automatically in response to an application, activation, startup, or other such action. Further, the feature that the process tracks can be specified or adjusted by a user, provider, or other such entity, and can include any appropriate feature such as a fingertip, hand, thumb, elbow, or other such feature. In at least some embodiments a determination can be made as to whether there is sufficient lighting for image capture and analysis, such as by using a light sensor or analyzing the intensity of captured image information. In at least some embodiments, a determination that the lighting is not sufficient can cause one or more types of illumination to be activated on the device. In at least some embodiments, this can include activating one or more white light LEDs positioned to illuminate a feature within the field of view of at least one camera attempting to capture image information. As discussed elsewhere herein, other types of illumination can be used as well, such as infrared (IR) radiation useful in separating a feature in the foreground from objects in the background of an image.

During the process, one or more selected cameras or gesture sensors can capture image information as discussed elsewhere herein. The selected cameras can have fields of view that include at least a portion of the region in front of a display element or other specified area of the device, such that the cameras can image a feature when interacting with that element. The captured image information, which can be a series of still images or a stream of video information in various embodiments, can be analyzed to attempt to determine or locate 604 the relative position of at least one feature to be monitored, such as the relative position of the user's index finger tip of a visible hand. As discussed elsewhere herein, various image recognition, contour matching, color matching, or other such approaches can be used to identify a feature of interest from the captured image information. Once a feature is located and its relative distance determined, the motion of that feature can be monitored 606 over time, such as to determine whether the user is performing an action indicative of input to be provided.

As discussed, the image information can be analyzed to determine a position of a fingertip of a user with respect to the electronic device, and a current position of a cursor displayed on a display screen of the computing device can be updated based on the position of the fingertip of the user. In the situation where the current position of the cursor corresponds to a location of an interface object, the appearance of the interface object can be altered, such as by highlighting the interface object. As discussed, at least one threshold or other such measure or criterion can be utilized to determine the number of axes for which to accept or determine input. During monitoring of the motion, the device can determine 608 whether the motion meets, falls within, falls outside, or otherwise reaches or exceeds some threshold with respect to the input to be provided.

If the motion is determined to be outside the threshold, the device can enable 610 input in at least two dimensions. If, in this example, the motion is determined to fall inside the threshold, the input can be limited 612 by at least one dimension. Alternatively, the input can be limited by at least one dimension in response to detecting the user's finger hovered over the desired selectable interface object for a predetermined period of time. In this instance, when the user's finger is positioned over the desired interface object, for example, for the predetermined period of time (e.g., three seconds), the interface object can be locked for selection and remains locked until an unlock event occurs. As discussed, this can involve locking or limiting motion in one or more directions in order to improve accuracy of the input. For certain motions, input might be effectively constrained to a direction or plane, etc. As described, in some situations, the locking or limiting motion can also include locking 614 an interface object to which the cursor is hovered over. This can cause the interface object to be highlighted in a second, different color, than the color used when the interface object was selected. Further still, the locking motion can include locking the current position of the cursor such that the current position does not change during the motion of the fingertip, e.g., by limiting an amount of change in the position of the cursor in one or two dimensions. In any situation, when the feature contacts at least a portion of the display screen, the interface object is selected 616.

In other embodiments, a user may want to unlock the locked interface object to select a different application, link, or other interface object. In this instance, the user can perform an unlock event that can cause the device to unlock the current locked interface object. An unlock event can include moving fingertip away from a locked object for more than a unlock time threshold. Additionally, an unlock event can include tapping any portion of the display of the computing device, and/or determining when the fingertip or other feature used for locking for selection a selectable object is not detected by the 3D position detection system for at least a threshold period of time. In any situation, the locked object is unlocked when the unlock event is detected, and the object is no longer highlighted (e.g., when previously highlighted.

While many of the examples discussed herein relate to interface object selection, it should be understood that various other uses can benefit from approaches discussed herein as well. For example, a user might utilize motion and gesture input for navigation, gaming, drawing, or other such purposes. When the user makes a certain action or motion, the device can effectively lock out one or more directions of input in order to improve the accuracy of the touch-based input. In addition, or alternative, to the thresholds discussed above, other actions or gestures can be used to assist in determining when to lock one or more directions of input. For example, a user might make a certain gesture or shape with the user's hand, such as bringing a finger and thumb together or making another specific hand gesture. In other embodiments, speed might be used to attempt to determine when to lock out other axes. For example, a selection action in z might be determined to be relatively fast, while variations in z due to position drift can be relatively slow, such that an action in z must have at least a minimum velocity to register as a selection action. In some embodiments, locking only occurs when the feature is positioned relative to a selectable object on the display, or other position where locking makes sense or provides an advantage. Certain contexts can be used to determine when to lock input as well, such as when a user is typing versus drawing, scrolling versus flipping, etc. In at least some embodiments, an interface might show an icon or other indicator when input is locked such that the user can know how movement will be interpreted by the device.

Figure 7:
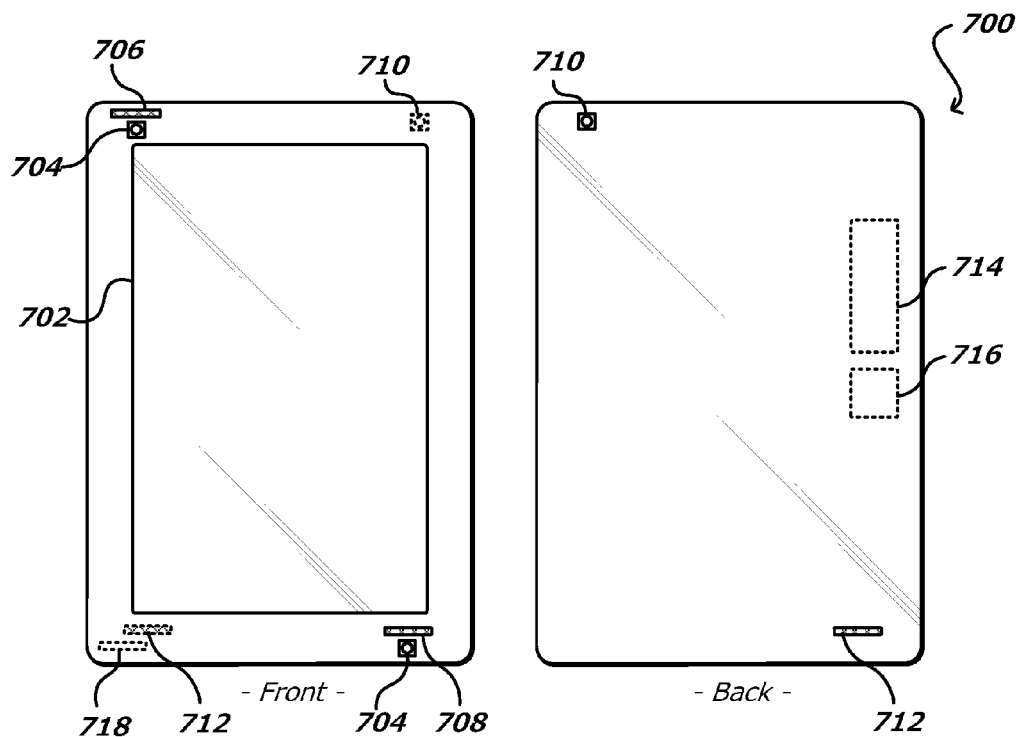
FIG. 7 illustrates front and back views of an example portable computing device that can be used in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
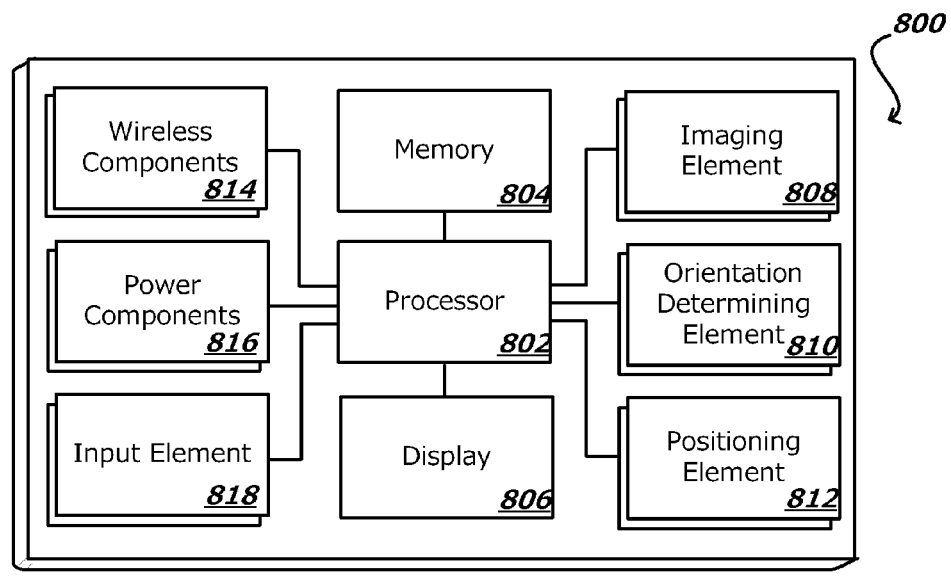
FIG. 8 illustrates an example set of basic components of a portable computing device, such as the device described with respect to FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 9:
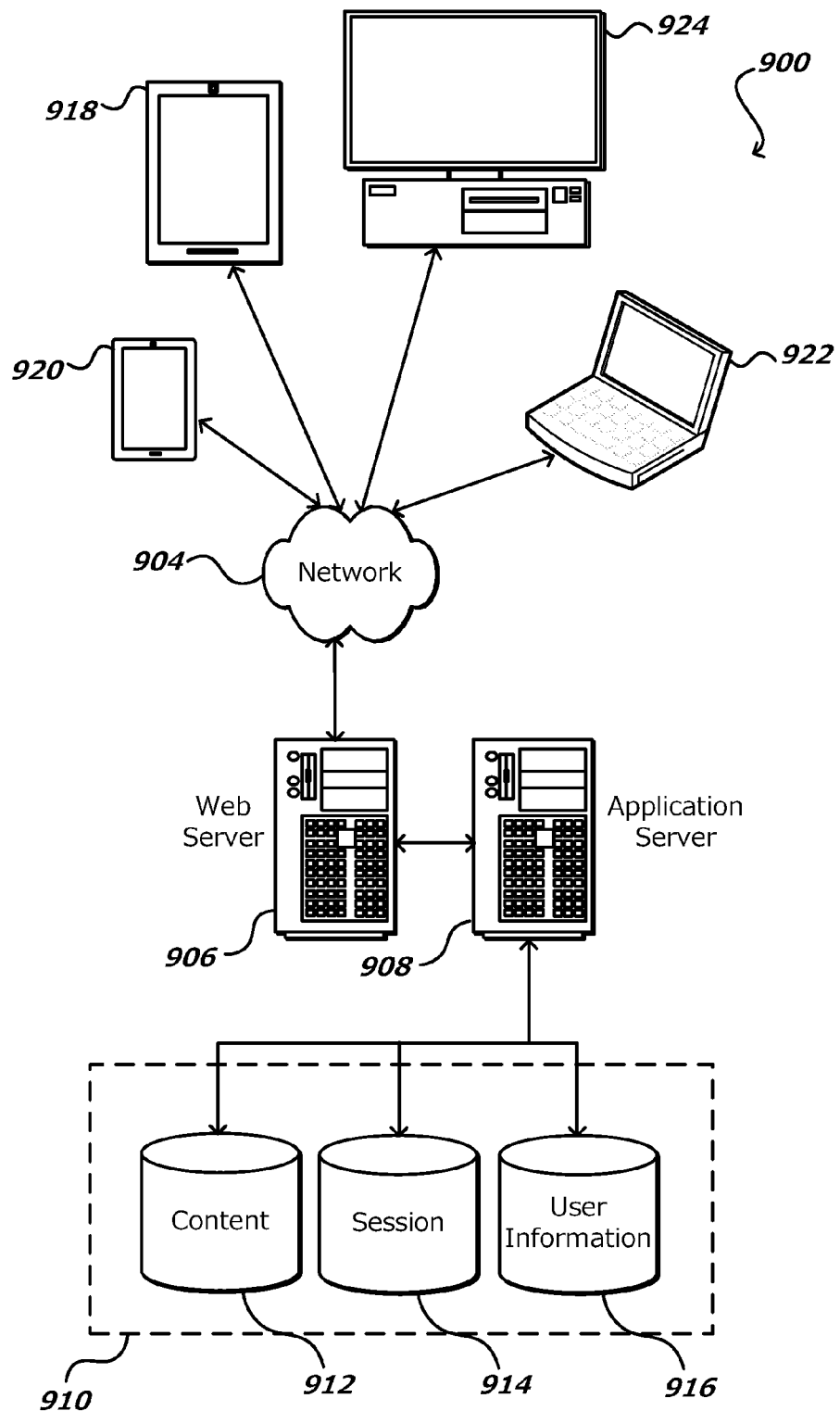
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for assisting touch-based input to a computing device, comprising:
    displaying content on a display screen of the computing device, the content including at least one selectable interface object;
    capturing an image using a camera of the computing device that includes a representation of a fingertip;
    analyzing the image, using a processor of the computing device, to determine a position of the fingertip with respect to the computing device;
    updating a current position of a cursor displayed on the display screen, the cursor configured to move across the content in two dimensions corresponding to movement of the fingertip in a plane relative to the display screen;
    detecting the current position of the cursor corresponding to a location of at least one selectable interface object;
    highlighting the at least one selectable interface object in a first color;
    detecting, from the captured image and using the processor, motion of the fingertip toward the display screen;
    determining that the current position of the fingertip meets a locking threshold relative to the display screen;
    locking the current position of the cursor, wherein the locked current position of the cursor does not change during the motion of the fingertip toward the display screen;
    highlighting the at least one selectable interface object in a second color; and
    causing the at least one selectable interface object to be selected as a result of the fingertip contacting at least a portion of the display screen.

2. The computer-implemented method of claim 1, further comprising:
    enabling the current position of the cursor to continue to update when an amount of motion of the fingertip toward the display screen does not at least meet the locking threshold.

3. The computer-implemented method of claim 1, further comprising:
    upon detecting the position of the fingertip above the locking threshold, allowing the cursor to move across the content in two dimensions corresponding to movement of the fingertip in the plane relative to the display screen.

4. A computer-implemented method for assisting touch-based input to a computing device, comprising:
    determining a position of a feature of a user with respect to the computing device, the position being determined in at least two dimensions;
    determining a first reference point and a second reference point of the feature;
    determining a vector intersecting the first reference point, the second reference point, and a selection element on a display screen of the computing device;
    determining that the position of the feature meets a distance threshold with respect to the computing device;
    limiting movement of the selection element by at least one dimension; and
    causing an interface object associated with the selection element to be selected as a result of the feature contacting at least a portion of the display screen.

5. The computer-implemented method of claim 4, wherein the position of the feature is capable of being determined in three dimensions, and limiting movement of the selection element includes limiting an amount of change in the position of the selection element to one or two dimensions.

6. The computer-implemented method of claim 4, further comprising:
  detecting the position of the selection element corresponding to a location of interface object displayed on the display screen of the computing device; and
  causing a first change in appearance of the interface object.

7. The computer-implemented method of claim 4, further comprising:
  causing a second change in appearance of the interface object in response to determining that the position of the feature meets the distance threshold.

8. The computer-implemented method of claim 4, wherein limiting movement of the selection element further includes:
  determining the selection element to be located above the interface object for at least a predetermined period of time.

9. The computer-implemented method of claim 4, further comprising:
  upon detecting the position of the feature above a locking threshold, allowing the selection element to move across the display screen of the computing device in two dimensions corresponding to movement of the feature relative to the display screen.

10. The computer-implemented method of claim 4, further comprising:
  capturing an image using a camera of the computing device;
  determining, from the captured image, the position of the feature of the user with respect to the computing device, the feature being one of a hand, a head, a finger, or a thumb of the user, or an object being held by the user, the computing device configured to cause the selection element to move across a display of the computing device corresponding to movement of the feature of the user;
  detecting the position of the selection element corresponding to a location of the interface object;
  determining the position of the feature of the user reaching at least a locking threshold relative to the computing device;
  causing the position of the selection element to become locked such that the position does not change during motion of the feature; and
  in response to a selection action, causing the interface object to be selected.

11. The computer-implemented method of claim 10, wherein the selection action includes at least one of contact by the feature to at least a portion of the display screen of the computing device or contact by a different feature to at least a portion of the display screen on the computing device.

12. The computer-implemented method of claim 4, wherein the selection element is at least one of a virtual cursor or a visual identifier indicating an item for selection with respect to the feature of the user.

13. The computer-implemented method of claim 6, wherein the first change in appearance includes highlighting the interface object.

14. The computer-implemented method of claim 4, further comprising:
  providing a first notification in response to detecting the position of the selection element corresponding to a location of the interface object displayed on the display screen of the computing device;
  providing a second notification in response to determining that the position of the feature meets the distance threshold; and
  wherein the first notification and the second notification include at least one of an audio, visual, or tactile alert.

15. A computing device, comprising:
  a device processor;
  a camera; and
  a memory device including instructions operable to be executed by the device processor to perform a set of actions, enabling the computing device to:
    determine a position of a feature of a user with respect to the computing device, the position being determined in at least two dimensions;
    determine a first reference point and a second reference point of the feature;
    determine a vector intersecting the first reference point, the second reference point, and a selection element on a display screen of the computing device;
    determine that the position of the feature meets a distance threshold with respect to the computing device;
    limit movement of the selection element by at least one dimension; and
    cause an interface object associated with the selection element to be selected as a result of the feature contacting at least a portion of the display screen.

16. The computing device of claim 15, wherein the position of the feature is capable of being determined in three dimensions, and limiting movement of the selection element includes limiting an amount of change in the position of the selection element to one or two dimensions.

17. The computing device of claim of claim 15, wherein the instructions, when executed by the device processor, further enable the computing device to:
  detect the position of the selection element corresponding to a location of interface object displayed on the display screen of the computing device; and
  cause a first change in appearance of the interface object.

18. The computing device of claim 15, wherein the instructions, when executed by the device processor, further enable the computing device to:
  cause a second change in appearance of the interface object in response to determining that the position of the feature meets the distance threshold.

19. The computing device of claim 15, wherein the instructions, when executed by the device processor, further enable the computing device to:
  upon detecting the position of the feature above a locking threshold, allow the selection element to move across the display screen of the computing device in two dimensions corresponding to movement of the feature relative to the display screen.

20. The computing device of claim 15, further comprising:
  a capacitive touch detection component configured to detect the position of the feature when the feature is within a determined distance of the display screen, the capacitive touch detection component configured to:
    cause the position of the selection element to become locked such that the position does not change during motion of the feature; and
    in response to a selection action, cause the interface object to be selected.

21. A non-transitory computer readable storage medium storing one or more sequences of instructions executable by one or more processors to perform a set of operations comprising:
  determining a position of a feature of a user hovered over a display screen of a computing device;
  determining a first reference point and a second reference point of the feature;
  determining a vector intersecting the first reference point and the second reference point to determine an interface object on a display screen of the computing device to which the feature is hovered over;

determining that the position of the feature meets a distance threshold with respect to the computing device;

locking the interface object to which the feature is hovered over; and selecting the interface object when the feature contacts at least a portion of a display screen of the computing device.

22. The non-transitory computer readable storage medium of claim 21, further comprising instructions executed by the one or more processors to perform the operations of:

capturing an image using a camera of the computing device;

determining, from the captured image, the position of the feature of the user with respect to the computing device, the feature being one of a hand, a finger, or a thumb of the user, or an object being held by the user;

detecting the position of the feature corresponding to a location of the interface object;

determining the position of the feature of the user reaching at least a locking threshold relative to the computing device; and causing the interface object to become locked such that contact with any portion of the display screen of the computing device causes the interface object to be selected.

23. The non-transitory computer readable storage medium of claim 22 further comprising instructions executed by the one or more processors to perform the operations of:

detecting the position of the feature when the feature is within a predetermined distance of the display screen; and causing the interface object to become locked such that contact with any portion of the display screen of the computing device causes the interface object to be selected.

24. The non-transitory computer readable storage medium of claim 23, wherein the position of the feature is capable of being detected using at least a capacitive touch detection component of the computing device.

25. The non-transitory computer readable storage medium of claim 21, further comprising instructions executed by the one or more processors to perform the operations of:

providing a first notification in response to detecting the position of the selection element corresponding to a location of the interface object displayed on the display screen of the computing device;

providing a second notification in response to determining that the position of the feature meets the distance threshold; and wherein the first notification and the second notification include at least one of an audio, visual, or tactile alert.

* * * * *